US008392822B2

(12) United States Patent (10) Patent No.: US 8,392,822 B2
Hungerford et al. (45) Date of Patent: Mar. 5, 2013

(54) DEPLOYING PRIVACY POLICY IN A NETWORK ENVIRONMENT

(75) Inventors: Julia Hungerford, Kirkland, WA (US); Barry A. Stulberg, Issaquah, WA (US); Gerald F. Brown, Newcastle, WA (US); Michael Stokes, Eagle, ID (US)

(73) Assignee: Microsoft Corporation, Redmond, WA (US)

( * ) Notice: Subject to any disclaimer, the term of this patent is extended or adjusted under 35 U.S.C. 154(b) by 914 days.

(21) Appl. No.: 12/143,756

(22) Filed: Jun. 21, 2008

(65) Prior Publication Data

US 2009/0320090 A1 Dec. 24, 2009

(51) Int. Cl.
*G06N 3/00* (2006.01)
(52) U.S. Cl. ...................................................... 715/234
(58) Field of Classification Search .................. 715/234, 715/243, 254
See application file for complete search history.

(56) References Cited

U.S. PATENT DOCUMENTS

| | | | |
|---|---|---|---|
| 6,959,420 B1 | 10/2005 | Mitchell et al. | |
| 7,076,558 B1 | 7/2006 | Dunn | |
| 7,225,460 B2 | 5/2007 | Barzilai et al. | |
| 7,269,853 B1 | 9/2007 | Dunn | |
| 7,299,410 B2 | 11/2007 | Kays et al. | |
| 7,305,432 B2 | 12/2007 | Feng et al. | |
| 2002/0122060 A1* | 9/2002 | Markel | 345/760 |
| 2003/0023451 A1 | 1/2003 | Willner et al. | |
| 2003/0195759 A1* | 10/2003 | Glassco et al. | 705/1 |
| 2005/0091101 A1 | 4/2005 | Epling et al. | |
| 2005/0283443 A1 | 12/2005 | Hardt | |
| 2006/0005227 A1 | 1/2006 | Samuelsson et al. | |
| 2006/0031505 A1 | 2/2006 | Ashley | |
| 2008/0189761 A1* | 8/2008 | Brodie et al. | 726/1 |
| 2009/0100498 A1* | 4/2009 | Grossi et al. | 726/1 |

FOREIGN PATENT DOCUMENTS

US EP1850263 A1 10/2007

OTHER PUBLICATIONS

Cranor et al. "The Platform for Privacy Preferences 1.0 (P3P1.0) Specification," Apr. 16, 2002, <http://www.w3.org/TR/P3P>.*
Brodie et al., "An Empirical Study of Natural Language Parsing of Privacy Policy Rules Using the SPARCLE Policy Workbench," Jul. 2006, pp. 1-12.*
"P3P Compliant Privacy Policy Editor & Free P3P Privacy Seal", 2002-2007, Net Dynamics, pp. 2.
Korba, et al., "Privacy Management Architectures for E-Services", Published in Privacy Protection for E-Services, Published by Idea Group Inc. 2006., Copyright 2006 by National Research Council of Canada, pp. 1-49.
Arshad, "Privacy Fox—A JavaScript-Based P3P Agent for Mozilla Firefox", Dec. 7, 2004, pp. 1-10.

(Continued)

*Primary Examiner* — Kyle Stork
(74) *Attorney, Agent, or Firm* — Alleman Hall McCoy Russell & Tuttle LLP

(57) ABSTRACT

An authoring application enables an administrative user to generate, validate, and deploy one or more privacy notices and legal notices in web pages that may be retrieved by a client user via a web browser. Two or more of the privacy notices generated by the authoring application may be deployed in a web page, and may be selectively presented to the client user via the web browser in accordance with the notification setting selected at the web browser. Two or more of the legal notices generated by the authoring application may be deployed in the web page or in a second web page. The legal notices may be selectively presented to the client user via the web browser in accordance with the notification setting.

14 Claims, 8 Drawing Sheets

OTHER PUBLICATIONS

"Privacy in Internet Explorer 6", 2008, Microsoft Corporation, p. 11.

Cranor, et al., "User Interfaces for Privacy Agents", ACM Transactions on Computer-Human Interaction (TOCHI), vol. 13, No. 2, Jun. 2006, pp. 1-48.

Sadeh, et al., "Privacy and Usability in Pervasive Computing", 2004, Carnegie Mellon CyLab, pp. 6.

* cited by examiner

FIG. 5

| FIRST PRIVACY NOTICE 151 | |
|---|---|
| ASSET_1 | VALUE_1 |
| ASSET_2 | VALUE_2 |
| ASSET_3 | VALUE_3 |
| ASSET_4 | VALUE_4 |
| ASSET_5 | VALUE_5 |
| ASSET_6 | VALUE_6 |
| ASSET_7 | VALUE_7 |
| ASSET_8 | VALUE_8 |

FIG. 6

| SECOND PRIVACY NOTICE 152 | |
|---|---|
| ASSET_1 | VALUE_1 |
| ASSET_2 | VALUE_2 |
| ASSET_3 | VALUE_3 |

FIG. 7

| SECOND PRIVACY NOTICE 152 | |
|---|---|
| ASSET_1 | VALUE_1 |
| ASSET_2 | VALUE_2 |
| ASSET_3 | VALUE_3 |
| ASSET_9 | VALUE_9 |
| ASSET_10 | VALUE_10 |

FIG. 8

| THIRD PRIVACY NOTICE 153 | |
|---|---|
| ASSET_1 | NULL |

FIG. 14

| SPECIFIED CONTENT | | LOCALIZATION SCHEMA |
|---|---|---|
| ASSET_1 | VALUE_1 | 151, 152, 155 |
| ASSET_2 | VALUE_2 | 151, 152, 155 |
| ASSET_3 | VALUE_3 | 151, 152 |
| ASSET_4 | VALUE_4 | 151 |
| ASSET_5 | VALUE_5 | 151 |
| ASSET_6 | VALUE_6 | 151 |
| ASSET_7 | VALUE_7 | 151 |
| ASSET_8 | VALUE_8 | 151, 155 |
| ASSET_9 | VALUE_9 | 152, 155, 156 |
| ASSET_10 | VALUE_10 | 152, 155, 156 |

FIG. 15

| FIRST LEGAL NOTICE 155 | |
|---|---|
| ASSET_1 | VALUE_1 |
| ASSET_2 | VALUE_2 |
| ASSET_8 | VALUE_8 |
| ASSET_9 | VALUE_9 |
| ASSET_10 | VALUE_10 |

FIG. 16

| SECOND LEGAL NOTICE 156 | |
|---|---|
| ASSET_9 | VALUE_9 |
| ASSET_10 | VALUE_10 |

US 8,392,822 B2

DEPLOYING PRIVACY POLICY IN A NETWORK ENVIRONMENT

BACKGROUND

Owners and operators of websites may present privacy notices and legal notices to client users who interact with web pages associated with their websites. The privacy notices may specify how the owner or operator of the website may use personal information of the client user that was acquired through the client user's interaction with the website. The legal notices may create a legally binding agreement or contract between the client user and the website owner or operator. Furthermore, some legal notices may include a privacy notice component. On one hand, owners and operators may seek to present both privacy notices and legal notices to their client users that are consistent across a given website or at least provide a coherent privacy policy, while client users may seek to achieve a better understanding of the privacy policy embodied in these privacy notices and legal notices.

SUMMARY

An approach for presenting a web page to a client user via a web browser is described. As one example, a user preference specifying a notification setting may be received from the client user at the web browser. The notification setting may cause the web browser, upon retrieving a web page, to present one or more of a privacy notice or a legal notice to the client user. The particular way in which the privacy notice and the legal notice are presented to the client user may be varied based on the notification setting specified by the user preference.

Furthermore, an authoring application is presented that enables an administrative user to generate, validate, and deploy privacy notices and legal notices in web pages that may be retrieved by the client user via the web browser. Two or more of the privacy notices and the legal notices generated by the authoring application may be deployed in a common web page, and may be selectively presented to the client user in accordance with the notification setting at the web browser.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 5-8 depict example data structures of privacy notices described herein.

FIG. 14 depicts an example data structure of a specification document.

FIGS. 15 and 16 depict example data structures of legal notices described herein.

DETAILED DESCRIPTION

Figure 1:
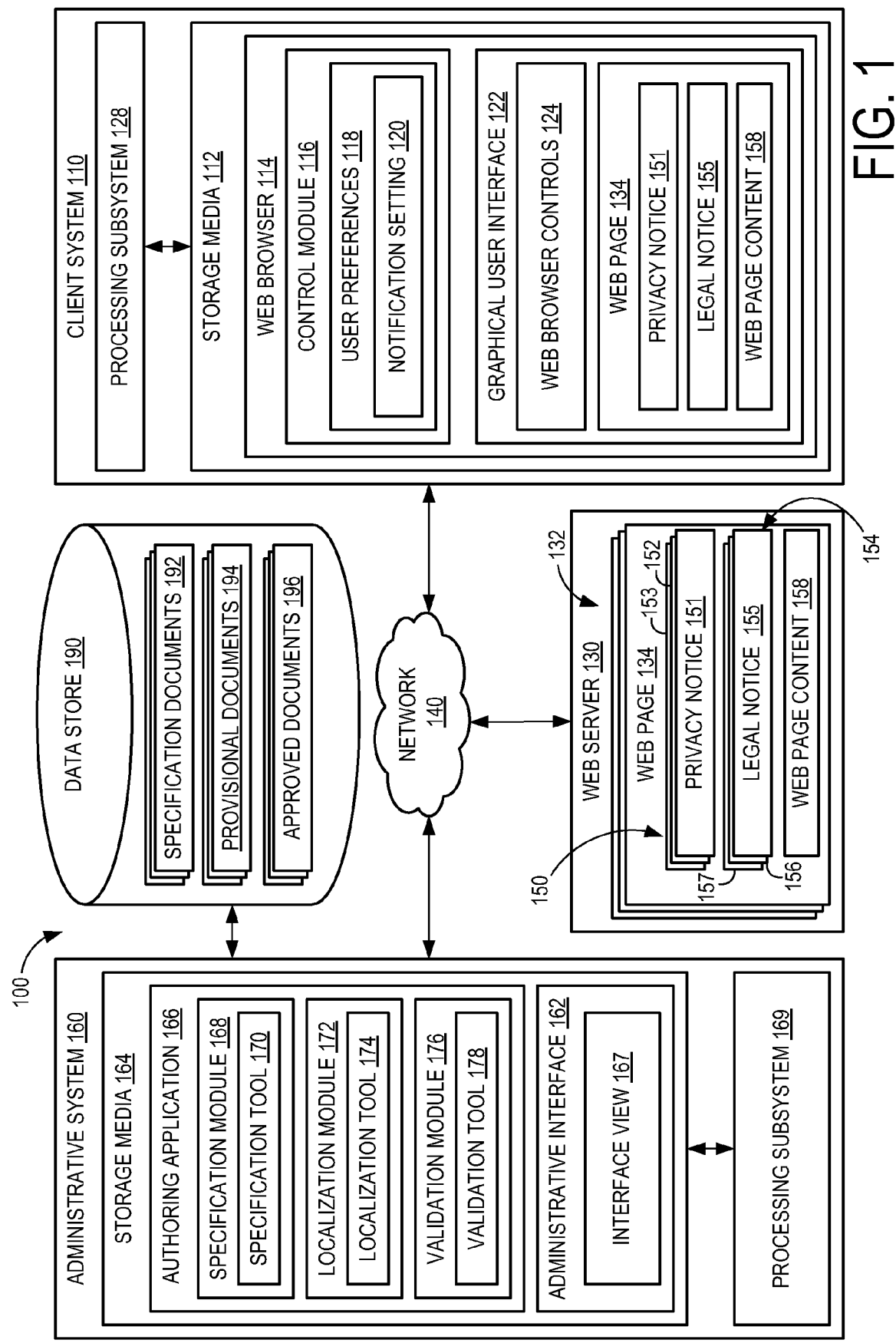
FIG. 1 illustrates an example network system.

FIG. 1 illustrates an example network system 100. A client system 110 may communicate with a web server 130 via a network 140. Network 140 may include one or more of a wide area network (WAN) (e.g., the Internet) and a local area network (LAN) (e.g., an intranet). As one example, client system 110 may request web pages from web server 130 via network 140. Web server 130 may return web pages to client system 110 via network 140, which may be rendered by a web browser 114.

Client system 110 may include a computer readable storage media 112 comprising instructions executable by a processing subsystem 128. These instructions may include a web browser 114. Web browser 114 may include a control module 116, which may be configured to receive user preferences 118 from a client user via web browser controls 124. Web browser controls 124 may be presented to the client user via a graphical user interface 122.

Web server 130 may include a collection of web pages 132 accessible to and retrievable by client system 110 via network 140. The collection of web pages 132 may be referred to collectively as a web site. As a non-limiting example, a web page 134 of the collection of web pages may be retrieved by client system 110 from web server 130, where a rendered portion of web page 134 may be presented to the client user via graphical user interface 122. Web page 134 may comprise one or more files including instructions, which may be interpreted by web browser 114 and executed by processing subsystem 128. These instructions may be specified by HTML, CSS, and/or other suitable languages.

Web page 134 may include one or more privacy notices and/or legal notices. As a non-limiting example, web page 134 may include a collection of privacy notices 150 and a collection of legal notices 154 in addition to web page content 158. These different privacy notices and legal notices may supplement each other and collectively form a coherent privacy policy. As described in greater detail with reference to FIGS. 2-10, web browser 114 may be configured to present a select privacy notice of the collection of privacy notices 150 to the client user via graphical user interface 122 based on a user preference. For example, a first privacy notice 151 may be rendered by the web browser where it may be presented to the client user via the graphical user interface. Furthermore, web browser 114 may be configured to present a select legal notice of the collection of legal notices 154 to the client user via graphical user interface 122. For example, a first legal notice 155 may be rendered by the web browser where it may be presented to the client user via the graphical user interface. Web page content 158 may also be presented to the client user via the graphical user interface.

A web page may include any suitable number of different privacy notices and different legal notices. As a non-limiting example, first privacy notice 151, a second privacy notice 152, and a third privacy notice 153 of the collection of privacy notices 150 may each include a different privacy statement associated with the web page and web site of which the web page is a member. For example, the privacy statement of each privacy notice may include one or more of a P3P compact privacy statement, a P3P long form privacy statement, a layered privacy statement, and a long form privacy statement, among other suitable privacy statements. Legal notice 154, a legal notice 155, and a legal notice 156 of the collection of legal notices may each include a different service agreement associated with the web page and the web site. The service agreement may include or specify terms of use that the client user accepts upon retrieving and interacting with the web page or related web pages of the website.

Figure 2:
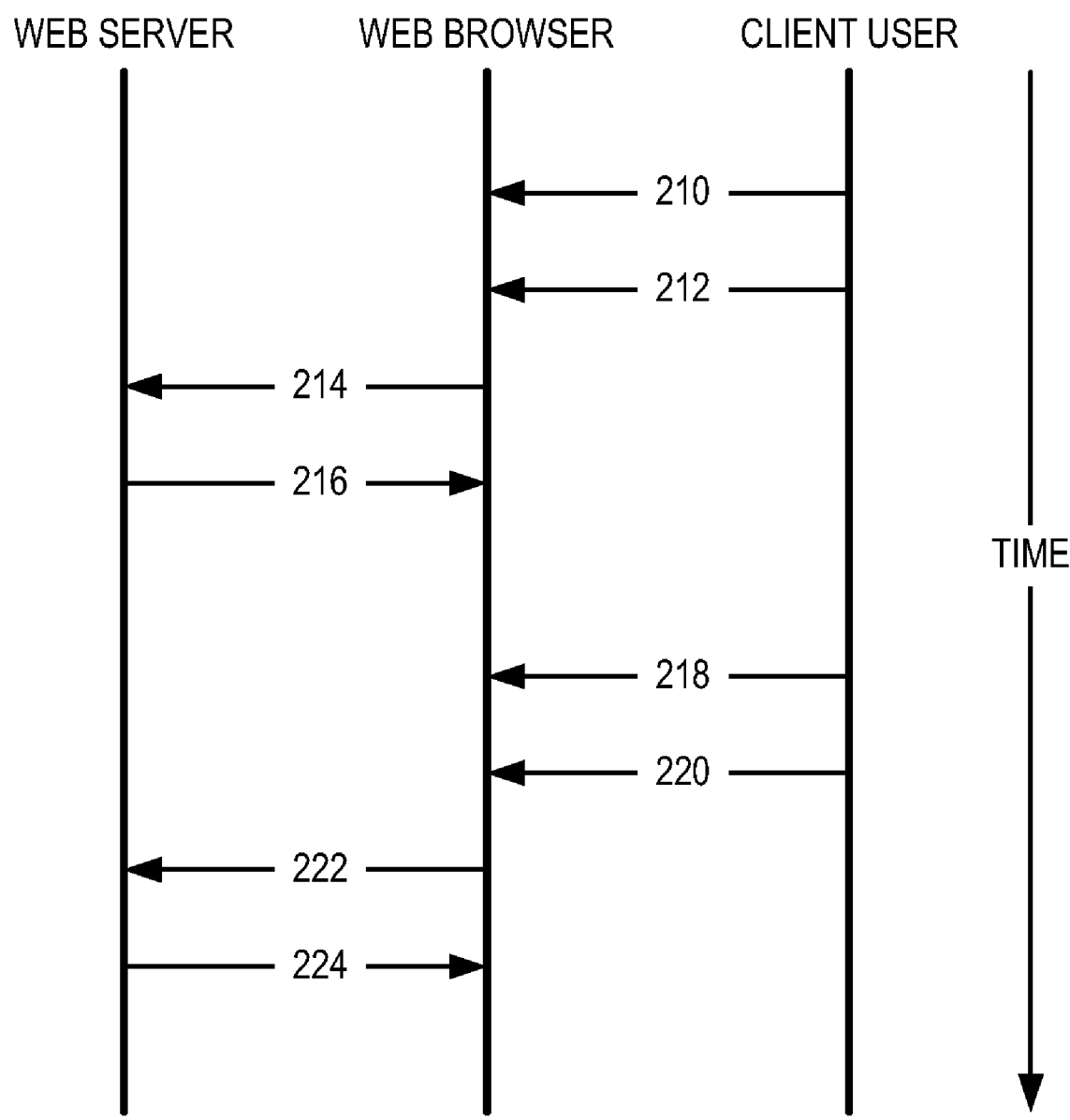
FIG. 2 illustrates an example process flow depicting how a web page may be presented at a web browser in accordance with a user preference.
Figure 3:
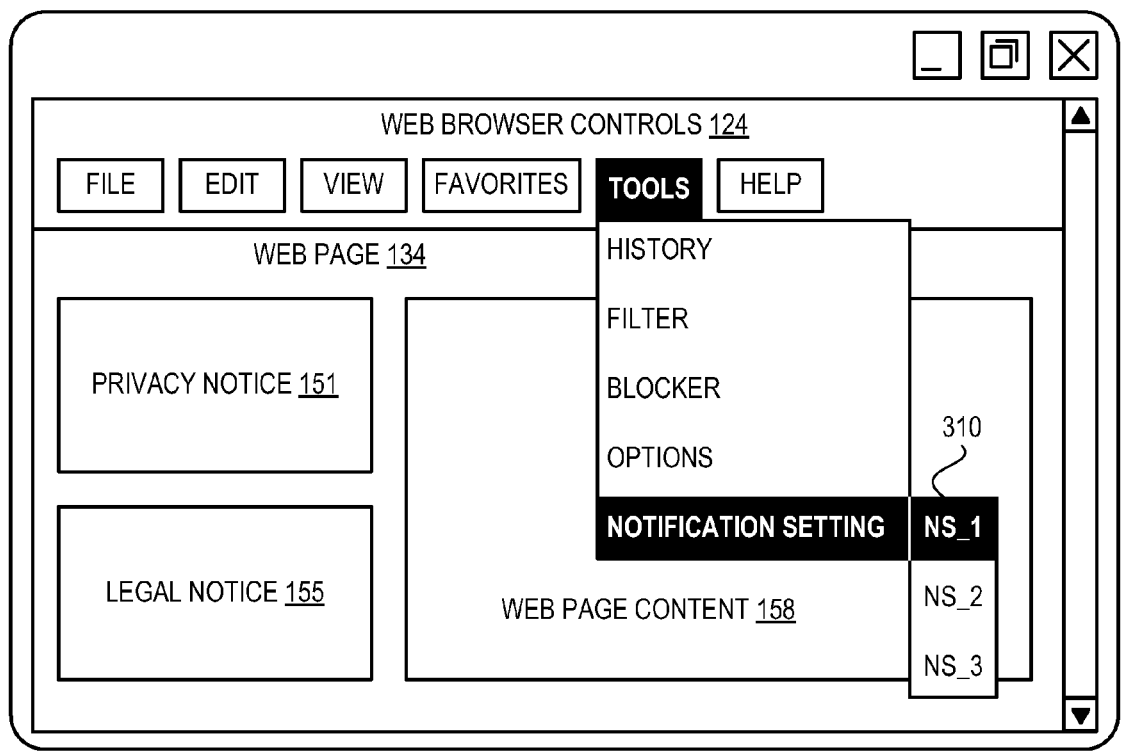
FIGS. 3 and 4 illustrate example graphical user interfaces of a web browser.

FIG. 2 illustrates an example process flow depicting how web page 134 may be retrieved by the client system and presented to the client user by the web browser in accordance with a user preference. At 210, a first user preference may be received from the client user at the web browser. The first user preference may specify a first notification setting. Referring also to FIG. 3, as a non-limiting example, the client user may select the first notification setting (NS_1) from a menu 310 of web browser controls 124. The first notification setting in this example is configured to cause first privacy notice 151 of the collection of privacy notices 150 to be presented to the client user upon rendering of the web page by the web browser.

At 212 of FIG. 2, the client user may request web browser 114 to retrieve web page 134 from web server 130. For example, the client user may submit a URL address to the web browser or select a hyperlink via a selector tool of the graphical user interface. At 214, web browser 114 may submit a web page request specifying web page 134 to web server 130 via network 140. As a non-limiting example, web browser 114 may submit the web page request utilizing HTTP or other suitable protocol.

At 216, web server 130 may return web page 134 specified by the web page request to client system 110 via network 140. For example, web page 134 may include instructions executable by processing subsystem 128, which causes web browser 114 to render select portions of web page 134 upon receiving web page 134 at the client system. Referring again to FIG. 3, first privacy notice 151 and the first legal notice 155 may be rendered by the web browser when the user preference specifies the first notification setting NS_1, whereby the first privacy notice and the first legal notice may be presented to the client user via the graphical user interface.

Figure 4:
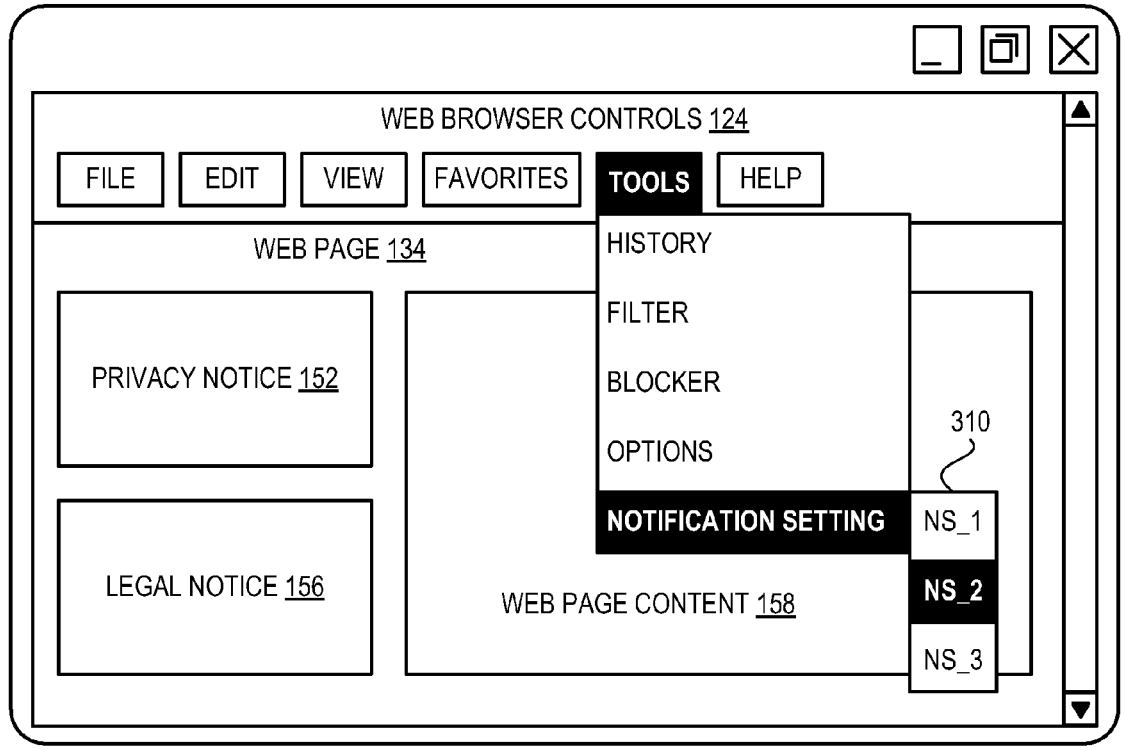

At 218, a second user preference may be received from the client user at the web browser. The second user preference may specify a second notification setting. Referring also to FIG. 4, as a non-limiting example, the client user may select the second notification setting (NS_2) from menu 310 of web browser controls 124. The second notification setting, in contrast to the first notification setting, may be configured to cause the second privacy notice 152 to be presented to the client user via the graphical user interface upon rendering of the web page by the web browser. As such, the notification setting selected by the client user may be one of a plurality of notification settings that may be presented to the client user via a menu of the graphical user interface of the web browser.

As a non-limiting example, the first notification setting may be representative of a novice client user setting and the second notification setting may be representative of an advanced client user setting. For example, the first privacy notice selectable by the first notification setting may include more educational content than the second privacy notice which may be presented upon selection of the second notification setting. In some embodiments, the web browser may default or initially set the user preference to specify the first notification setting before receiving a user preference at the web browser from the client user.

At 220, the client user may once again request web browser 114 to retrieve web page 134 from web server 130. At 222, web browser 114 may submit a web page request specifying web page 134 to web server 130 via network 140. At 224, web server 130 may return web page 134 specified by the web page request to client system 110 via network 140. Web browser 114 upon receiving web page 134 may cause processing subsystem 128 to execute instructions specified by web page 134 in accordance with the second notification setting. For example, referring to FIG. 4, second privacy notice 152 and second legal notice 156 may be rendered by the web browser when the user preference specifies the second notification setting NS_2, whereby the second privacy notice and the second legal notice may be presented to the client user via the graphical user interface.

FIGS. 5-8 schematically depict how these privacy notices may differ from each other. As shown in FIG. 5, first privacy notice 151 may include content represented by a collection of assets (e.g., ASSET_1-ASSET_8) as specified by the web page (e.g., web page 134). Each of these assets may include a corresponding value (e.g., VALUE_1-VALUE_8), which may be rendered by the web browser and presented to the client user via the graphical user interface.

FIGS. 6 and 7 show different examples of second privacy notice 152. FIG. 6 depicts the second privacy notice including content represented by a collection of assets (e.g., ASSET_1-ASSET_3) and corresponding collection of values (e.g., VALUE_1-VALUE_3) which may be rendered by the web browser and presented to the client user via the graphical user interface. FIG. 7 shows an alternative example of the second privacy notice including content represented by a collection of assets (e.g., ASSET_1-ASSET_3, ASSET_9, and ASSET_10) and corresponding collection of values (e.g., VALUE_1-VALUE_3, VALUE_9, and VALUE_10) which may also be rendered by the web browser and presented to the client user via the graphical user interface.

These assets may include different classes of content, including text, hyperlinks, images, and videos. The value corresponding to each asset may represent the content to be rendered by the web browser, such as text to be presented to the client user via the graphical user interface, object source and destination anchors associated with a hyperlink to be presented to the client user, image content, and video content, etc. As such, the first privacy notice may include different content than the second privacy notice. Similarly, as shown in FIGS. 15 and 16, first legal notice 155 may include different content than second legal notice 156.

In some embodiments, first privacy notice 151 and second privacy notice 152 may share some of the same content as demonstrated by the examples shown in FIGS. 5 and 6. For example, the first privacy notice and the second privacy notice may each include ASSET_1-ASSET_3 and corresponding VALUE_1-VALUE_3. In some embodiments, the second privacy notice may represent a truncated version of the first privacy notice. For example, the first privacy notice may include the second privacy notice and additional content supplementing the second privacy notice (e.g., VALUE_9 and VALUE_10). In some examples, the content supplementing the second privacy notice may include content further explaining the second privacy notice.

In other embodiments, the second privacy notice may include content that is not present in the first privacy notice, and the first privacy notice may include content that is not present in the second privacy notice. For example, first privacy notice 151 may include ASSET_4-ASSET_8 and corresponding VALUE_4-VALUE_8, which are not present in second privacy notice 152. Second privacy notice 152 may include ASSET_9 and ASSET_10 and corresponding VALUE_9 and VALUE 10, which are not present in first privacy notice 151.

Referring again to FIGS. 3 and 4, when the first user preference specifying the first notification setting NS_1 is received by the web browser, the web browser causes the first privacy notice 151 to be presented to the client user via the graphical user interface. However, when the second user preference specifying the second notification setting NS_2 is received by the web browser, the web browser causes second privacy notice 152 to be presented to the client user via the graphical user interface.

In some embodiments, the web browser may present only two notification settings that may be selected by the client user. In other embodiments, such as shown in FIGS. 3 and 4, the web browser may present three or more notification settings that may be selected by the client user. FIG. 8 shows an example of third privacy notice 153 that may be presented to the client user when the privacy preference specifying a third notification setting NS_3 is received at the web browser. As a non-limiting example, third privacy notice 153 may be configured not to present privacy policy content to the client user via the graphical user interface. Thus, in this example, ASSET_1 includes a corresponding NULL value which may cause the web browser not to render the third privacy notice. In other words, notification setting NS_3 may be selected by the client user to cause web browser 114 not to display the third privacy notice via the graphical user interface. In this way, a client user may tailor the user experience provided by the web browser with respect to the presentation of privacy notices.

While FIGS. 5-8 have been described with respect to privacy notices, a similar approach may be applied to legal notices. For example, referring again to FIGS. 3 and 4, when the user preference specifying the first notification setting NS_1 is received by the web browser, the web browser may cause first legal notice 155 to be presented to the client user via the graphical user interface. When the user preference specifying the second notification setting NS_2 is received by the web browser, the web browser may cause second legal notice 156 to be presented to the client user via the graphical user interface. First legal notice 155 and second legal notice 156 may include different content as previously described with respect to the privacy notices and as shown in FIGS. 15 and 16. For example, the first legal notice may include the second legal notice and further include content supplementing the second legal notice. In other examples, the first legal notice may include content not present in the second legal notice, while the second legal notice may include content not present in the first legal notice.

In some embodiments, the number of selectable notification settings that are presented to the client user may be specified by the web page. For example, the web browser may be configured to execute instructions specified by the web page to cause a specified number of notification settings to be presented to the client user for selection. Each of the notification settings can include a corresponding privacy notice and/or legal notice that may be rendered by the web browser upon selection of the notification setting.

Figure 9:
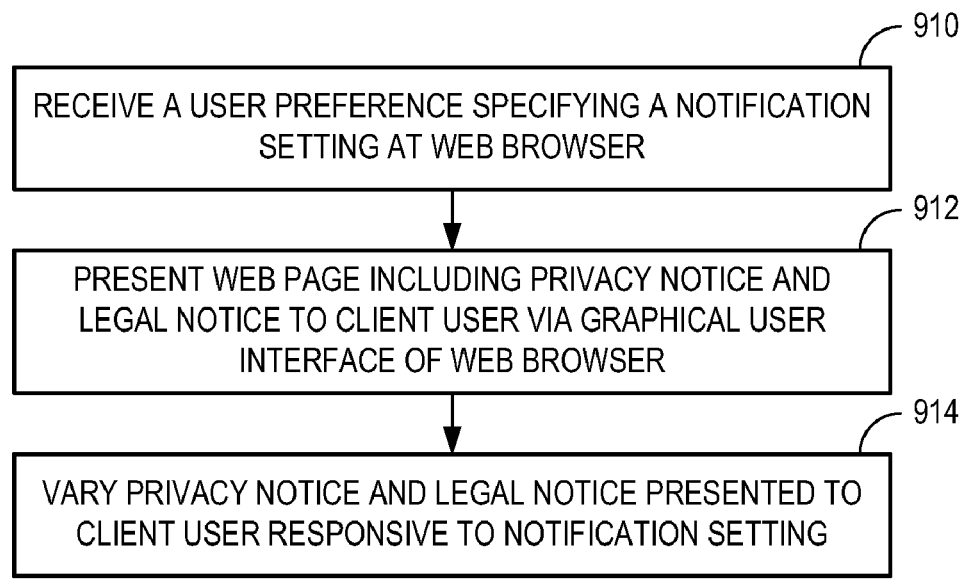
FIGS. 9-10 illustrate example process flows for varying the privacy notice or legal notice rendered by the web browser responsive to a notification setting at the web browser.

FIG. 9 illustrates an example process flow for varying the privacy notice and legal notice that are rendered by the web browser and presented to the client user. At 910, a user preference may be received at the web browser specifying a notification setting. At 912, the web page, including one or more of the privacy notice and the legal notice, may be presented to the client user via the graphical user interface of the web browser. At 914, one or more of the privacy notice and the legal notice presented to the client user may be varied responsive to the notification setting specified by the user preference. For example, the web browser may be configured to render the privacy notice in accordance with the selected notification setting.

In some embodiments, varying the privacy notice may include adjusting an amount of the privacy notice that is presented to the client user via the graphical user interface of the web browser. Similarly, varying the legal notice may include adjusting an amount of the legal notice that is presented to the client user via the graphical user interface.

In some embodiments, varying the privacy notice may include adjusting content of the privacy notice that is presented to the client user via the graphical user interface responsive to the notification setting. Similarly, varying the legal notice may include adjusting content of the legal notice that is presented to the client user via the graphical user interface. In some examples, the content may include text; and adjusting the content of the privacy notice or the legal notice may include adjusting an amount of the text presented to the client user via the graphical user interface. In some examples, the content may include a hyperlink; and adjusting the content of the privacy notice or the legal notice may include adjusting a destination anchor of a hyperlink presented to the client user via the graphical user interface. In some examples, the destination anchor of the hyperlink may specify another privacy notice or legal notice of the website or web page.

In some embodiments, the privacy notice or the legal notice presented via the graphical user interface may be varied responsive to the notification setting by rendering a first portion of the privacy notice at the graphical user interface when a first notification setting of the plurality of notification settings is specified by the user preference and by rendering a second portion of the privacy notice at the graphical user interface when the second notification setting of the plurality of notification settings is specified by the user preference.

Figure 10:
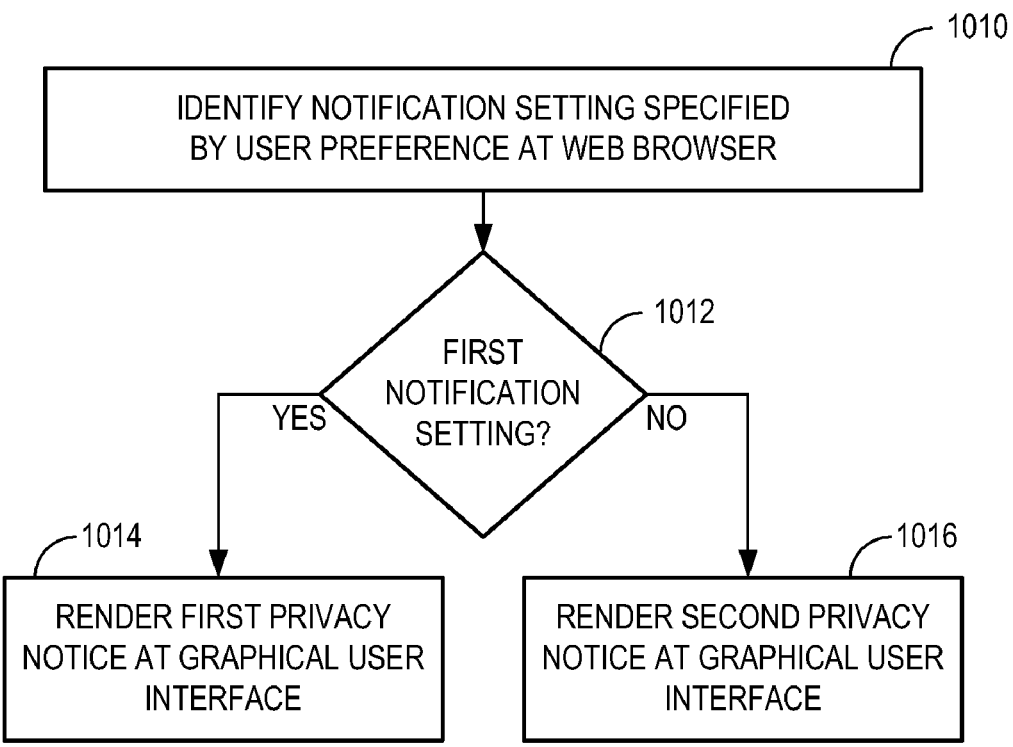

FIG. 10 illustrates an example process flow for rendering one of two or more privacy notices specified by a web page. It should be appreciated that the process flow of FIG. 10 is also applicable for rendering one of two or more legal notices specified by a web page as illustrated in FIGS. 2 and 3. At 1010, the notification setting specified by the user preference may be identified by the web browser. At 1012, it may be judged whether the user preference specifies the first notification setting. If the answer at 1012 is judged yes, the process flow may proceed to 1014. Alternatively, if the answer at 1012 is judged no, the process flow may proceed to 1016. At 1014, the first privacy notice may be rendered by the web browser at the graphical user interface where the first privacy notice may be presented to the client user. Alternatively, at 1016, the second privacy notice may be rendered by the web browser at the graphical user interface where the second privacy notice may be presented to the client user. In this way, the client user may select which of the different privacy notices of a web page are presented via the graphical user interface. As previously described, these different privacy notices may supplement each other and collectively form a coherent privacy policy.

Referring once again to FIG. 1, the collection of privacy notices and the collection of legal notices previously described in the context of user preference control may be deployed in one or more of web pages 132 that are retrievable by the client user via the web browser. For example, in the previous examples, web page 134 included or specified a collection of privacy notices including two or more different privacy notices and a collection of legal notices including two or more legal notices. It should be appreciated that in other examples, the collection of privacy notices may be deployed in a first web page, while the collection of legal notices may be deployed in a second web page.

FIG. 1 further illustrates an administrative system 160 that may be operated by an administrative user via an administrative interface 162 to generate, validate, and deploy one or more of the previously described privacy notices and legal notices. Administrative system 160 may include a computer readable storage media 164 comprising instructions executable by a processing subsystem 169. These instructions when executed by the processing subsystem 169 may provide an authoring application 166, including one or more of a specification module 168, a localization module 172, and a validation module 176.

Specification module 168 may include a specification tool 170. Specification tool 170 may be used by the administrative user to generate specification documents. These specification documents may be in turn used by the localization module to generate privacy notices and legal notices that may be deployed in a web page. Localization module 172 may include a localization tool 174. Localization tool 174 may be used by the administrative user to generate a collection of privacy notices and a collection of legal notices from specification documents generated by the specification module. Validation module 176 may include a validation tool 178. Validation tool 178 may be used by the administrative user to review and validate each of the privacy notices and legal notices that are generated by the localization module before these privacy notices and legal notices are deployed in web pages that may be retrieved by the client user.

Administrative interface 162 may include an interface view 167. Interface view 167 may be used by the administrative user to interact with the specification tool, the localization tool, and the validation tool as described herein. As a non-limiting example, interface view 167 may include a graphical user interface. In some embodiments, the interface view may be exposed to the administrative user via a web browser or other suitable software application.

Figure 11:
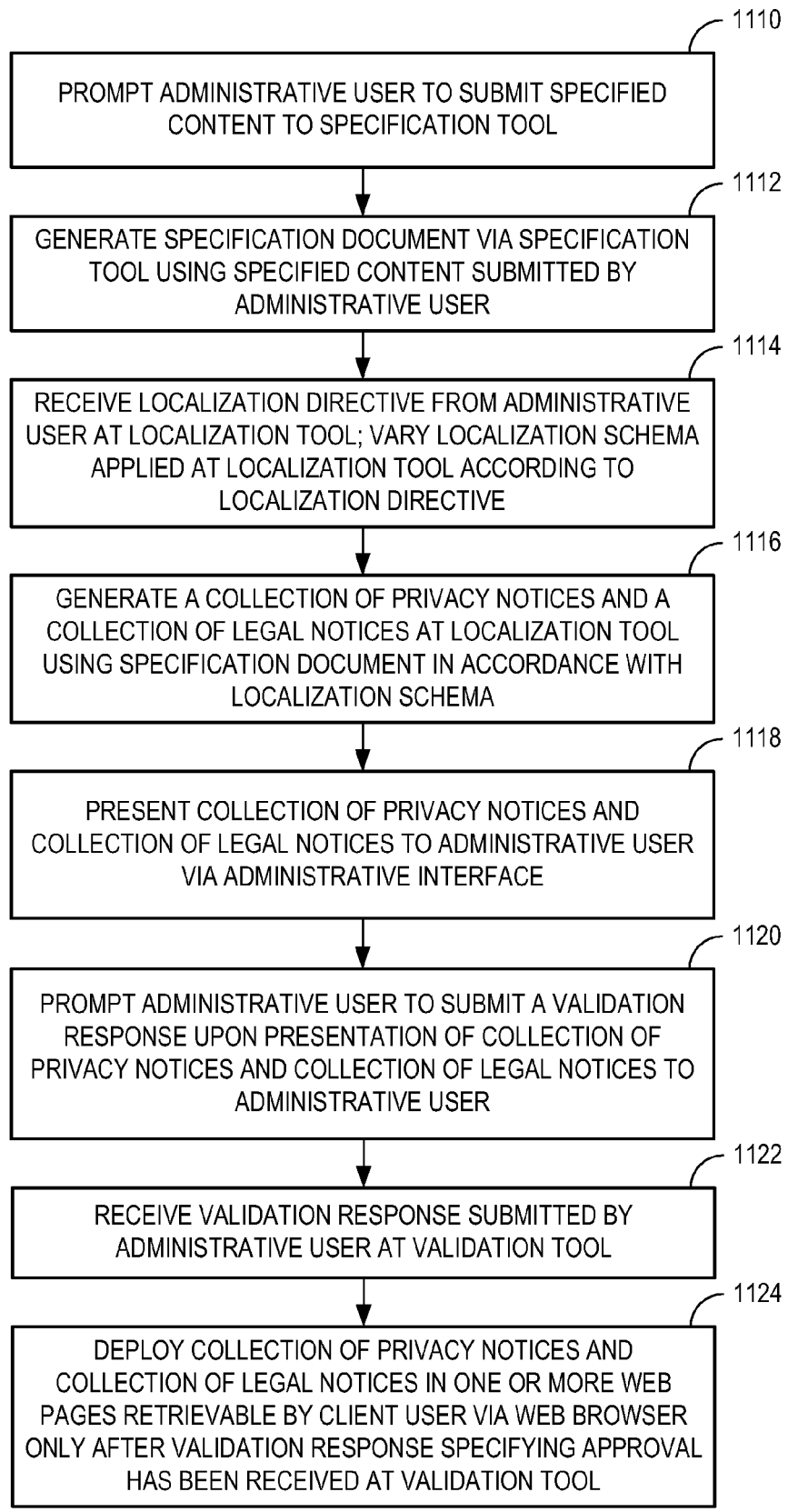
FIGS. 11-13 illustrate example process flows for specifying, generating, and deploying privacy notice and legal notice in web pages that may be retrieved by a client user.

FIG. 11 illustrates an example process flow for deploying privacy notices and legal notices in web pages retrievable by the client user. At 1110 the authoring application may prompt the administrative user to submit specified content to the specification tool. In some examples, the client user may be prompted via the administrative interface. The specified content may include assets and corresponding values that may form constituent components of the privacy notices and legal notices. As previously described, these assets may include text, hyperlinks, images, and video that may be utilized by the authoring application to generate privacy notices and legal notices that may be eventually deployed in one or more web pages that may be presented to the client user. In some embodiments, the administrative user may be prompted with a wizard application or a web form presented to the administrative user via interface view 167. As a non-limiting example, the wizard application or the web form may specify the assets to be utilized by each of the privacy notices and legal notices, whereby the administrative user may be prompted to submit respective values corresponding to the assets as the specified content.

At 1112, the authoring application may generate a specification document at the specification tool using the specified content submitted by the administrative user. In some embodiments, the specification document generated at 1112 may be stored at data store 190 as indicated at 192, where it may be later retrieved by the localization module to generate privacy notices and legal notices. The specification document may be used by the localization module to generate one or more privacy notices and/or legal notices. As a non-limiting example, the specification document may include all of the constituent components of the various privacy notices and legal notices that may be generated from the specification document. FIG. 14 shows a schematic depiction of a data structure for an example specification document that may be used to generate first privacy notice 151, second privacy notice 152, as well as first legal notice 155 and second legal notice 156 depicted by FIGS. 15 and 16.

The specification document may further specify which assets and values may be associated with each privacy notice and legal notice. For example, FIG. 14 shows how the specification document may include a localization schema that maps the assets and values of the specified content to the privacy notices and legal notices that may be generated from the specification document. As shown in FIG. 14, each of first privacy notice 151, second privacy notice 152, first legal notice 155, and second legal notice 156 are represented in the localization schema column and correspond to the examples depicted in FIGS. 5, 7, 15, and 16.

At 1114, the authoring application may optionally receive a localization directive from the administrative user at the localization tool. The localization directive may cause the localization tool to vary the localization schema of the specification document according to the localization directive. In this way, the administrative user may select which privacy notices and legal notices are generated from the specification document, as well as the assets and corresponding values associated with each of the privacy notices and legal notices.

At 1116, the authoring application may generate a collection of privacy notices and a collection of legal notices at a localization tool using the specification document in accordance with the localization schema. As one example, the localization module may retrieve the specification document generated at 1112 from data store 190. The localization tool may be configured to populate any suitable document with the assets and values specified by the specification document to generate the privacy notices and legal notices.

As a non-limiting example, the localization tool may be configured to generate each of the privacy notices and legal notices as separate web pages that may be retrieved by the web browser of the client user to cause the privacy notice or legal notice to be displayed to the client user via the graphical user interface. In other embodiments, the localization tool may be configured to generate two or more privacy notices and legal notices as a single web page. For example, as previously described with reference to FIGS. 9 and 10, web page 134 may include a collection of privacy notices and/or legal notices that may be presented to the client user in accordance with the notification setting at the web browser. It should be appreciated that the localization module may be configured to generate any suitable document, including documents incorporating html, xml, aspx, etc.

Furthermore, the privacy notices generated by the localization module may include one or more of a P3P compact privacy statement, a P3P long form privacy statement, a layered privacy statement, a traditional long form statement, among other suitable privacy notices. The legal notices generated by the localization module may include a layered service agreement or a long form service agreement specifying terms of use, among other suitable legal notices. In some embodiments, the legal notice generated by the localization module may include a privacy notice component. As such, it should be appreciated that some of the legal notices generated by the localization module may incorporate one or more of the privacy notices described herein.

As a non-limiting example, at 1116, the localization tool may generate a collection of privacy notices 150 and may include at least first privacy notice 151 and the second privacy notice 152. The second privacy notice may comprise different content than the first privacy notice as depicted in FIGS. 5, 6, and 7, for example. The localization tool may also generate the collection of legal notices 154, including at least legal notice 155. In some embodiments, the localization module may be configured to store the collection of privacy notices and the collection of legal notices generated by the localization tool at data store 190 as provisional documents 194 pending approval by the administrative user.

At 1118, the authoring application may present the collection of privacy notices and the collection of legal notices generated via the localization tool to the administrative user for approval via the administrative interface. In some embodiments, the validation tool may retrieve the collection of privacy notices and the collection of legal notices from data store 190, in the examples where they were previously stored as provisional documents 194. In some embodiments, the validation tool may present each of the privacy notices and legal notices generated by the localization tool to the administrative user via interface view 167. In some embodiments, the validation tool may enable the administrative user to select which privacy notices and legal notices are presented to the administrative user for review.

At 1120, the authoring application may prompt the administrative user to submit a validation response upon presentation of the collection of privacy notices and the collection of legal notices to the administrative user. In some examples, the administrative user may be prompted via the administrative interface and the validation response may be submitted at the validation tool. The validation response may specify an approval or a denial of the collection of privacy notices and the collection of legal notices. In some embodiments, the validation tool may prompt the administrative user to submit a single validation response specifying an approval or denial of the collection of privacy notices and the collection of legal notices generated by the specification module. In other embodiments, the validation tool may prompt the administrative user to submit a first validation response specifying an approval or a denial of the collection of privacy notices and a second validation response specifying an approval or a denial of the collection of legal notices. In still other embodiments, as will be described in greater detail with reference to the process flow of FIG. 12, the validation tool may prompt the administrative user to submit a separate validation response for each privacy notice and each legal notice generated by the localization module, or for each document generated by the localization module in examples where multiple privacy notices and/or legal notices are generated and deployed in a common document (e.g., web page).

At 1122, the authoring application may receive the validation response submitted by the administrative user at the validation tool. In some embodiments, upon approval of a privacy notice or a legal notice, the validation module may store the privacy notice or the legal notice at the data store as approved documents 196. At 1124, the collection of privacy notices and the collection of legal notices may be deployed in one or more web pages that are retrievable by a client user via the web browser only after the validation response specifying the approval has been received at the validation tool.

The privacy notices and the legal notices approved by the administrative user may be deployed in web pages 132 retrievable by the client user via web browser 114. As a non-limiting example, the privacy notices and legal notices stored as approved documents 196 at data store 190 may be uploaded to web server 130. For example, one or more of first privacy notice 151, second privacy notice 152, and third privacy notice 153 may be deployed in web page 134 at web server 130. Further, one or more of first legal notice 155, second legal notice 156, and third legal notice 157 may be deployed in web page 134 at web server 130. In some embodiments, web page 134 may be generated at least in part by the localization module as previously described with reference to 1116 of FIG. 11.

By utilizing the validation tool to approve the privacy notices and legal notices, the client user may only retrieve the web page including the privacy notice or legal notice after the administrative user has approved the privacy notice or legal notice. For example, the client user may retrieve the web page including at least the first privacy notice and the second privacy notice via the web browser only when the validation response specifies the approval of the collection of privacy notices; and the client user may be permitted to access the web page including at least the first legal notice via the web browser only when the validation response specifies the approval of the collection of these legal notices.

Figure 12:
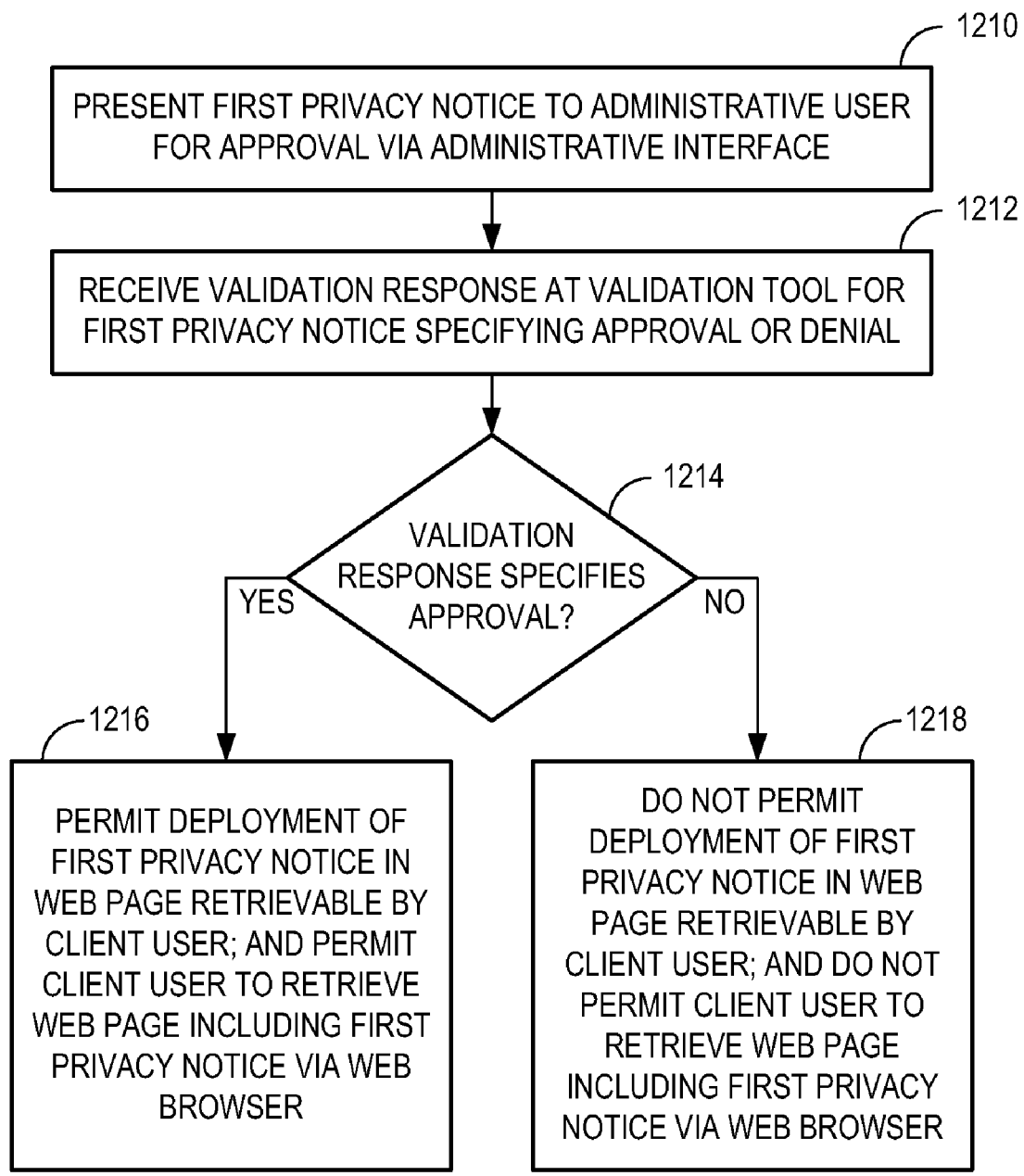

As previously described with reference to operations 1118-1124, the authoring application may be configured to prompt the administrative user for approval of one or more privacy notices and legal notices. FIG. 12 illustrates a non-limiting example the process flow from the perspective of first privacy notice 151. It should be appreciated that the process flow of FIG. 12 may be similarly applied to other privacy notices or legal notices.

At 1210, the first privacy notice may be presented to the administrative user for approval via the administrative interface, for example, as previously described with reference to 1118. As a non-limiting example, the first privacy notice may be presented to the administrative user by rendering the first privacy notice via interface view 167 in a similar manner as may be rendered by web browser 114 at graphical user interface 122. In this way, the administrative user may view the privacy notice as may be viewed by the client user.

At 1212, a validation response may be received from the administrative user at the validation tool for the first privacy notice presented to the administrative user at 1210. For example, the validation response may be submitted to the administrative system via the administrative interface. The validation response received at 1212 may specify an approval or a denial of the first privacy notice presented to the administrative user at 1210.

At 1214, it may be judged whether the validation response received at 1212 specifies the approval. If the answer at 1214 is judged yes, the process flow may proceed to 1216. At 1216, the validation module may permit the deployment of the first privacy notice in a web page retrievable by the client user; and the client user may be permitted to retrieve the web page including the first privacy notice via the web browser. For example, first privacy notice 151 may be deployed in web page 134 at web server 130. In some embodiments, the validation module may be configured to store the first privacy notice at the data store as approved documents 196 upon receiving the validation response specifying the approval of the first privacy notice.

Alternatively, if the answer at 1214 is judged no (i.e., the validation response has not yet been received from the administrative user or the validation response specifies the denial), the process flow may proceed to 1218. At 1218, the validation module does not permit the deployment of the first privacy notice in a web page retrievable by the client user; and the client user is not permitted to retrieve the web page including the first privacy notice. In this way, in at least some embodiments, the first privacy notice may be presented to the client user only after the first privacy notice has been approved by the administrative user via the validation tool.

Figure 13:
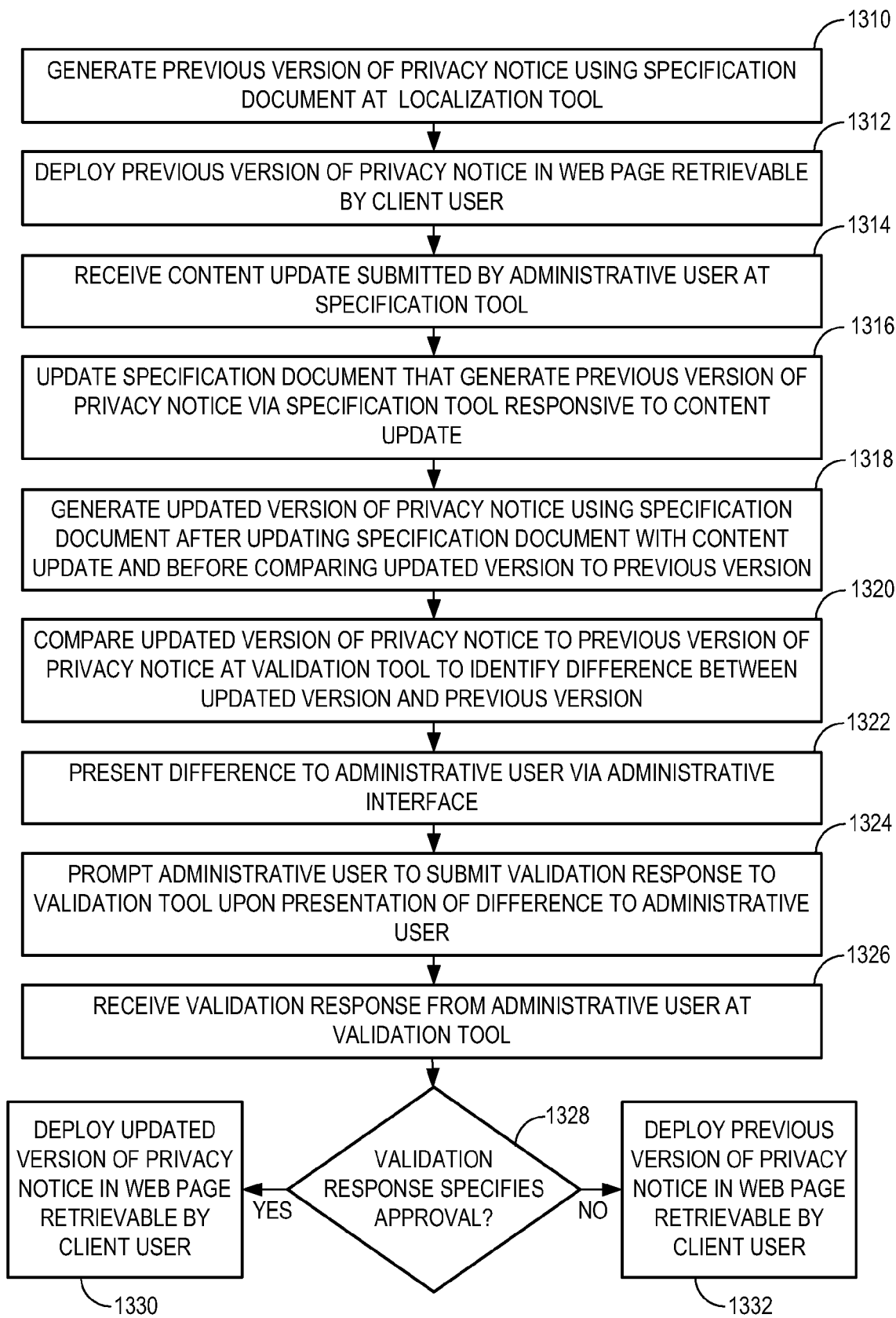

FIG. 13 illustrates an example process flow for managing multiple versions of a privacy notice or a legal notice. At 1310, the specification module may generate a previous version of the privacy notice using the specification document at the localization tool, for example, as previously described with reference to 1116 of FIG. 11. At 1312, the previous version of the privacy notice may be deployed in a web page retrievable by the client user as previously described at 1124 of FIG. 11.

At 1314, the authoring application may receive a content update submitted by the administrative user at the specification tool. As one example, the specification tool may be configured to retrieve the specification document used to generate the previous version of the privacy notice from data store 190 as stored at specification documents 192.

At 1316, the authoring application may update the specification document that generated the previous version of the privacy notice via the specification tool responsive to the content update received at 1314. In some examples, the content update may include new assets that were not present in the specification document. In some examples, the content update may include updated values for assets that were present in the specification document.

At 1318, the specification tool may generate an updated version of the privacy notice using the specification document after updating the specification document with the content update and before comparing the updated version to the previous version at the validation tool as will be described at 1320. The updated version of the privacy notice may be the same as or different than the previous version of the privacy notice depending on whether the content update affected assets or values that are used to generate the privacy notice.

For example, FIG. 14 shows specified content that may be used by the specification tool to generate the collection of privacy notices and the collection of legal notices. If ASSET_10 and corresponding VALUE_10 were added with the content update, then first privacy notice 151 shown in FIG. 5 would not be affected by the content update. However, second privacy notice 152 shown in FIG. 7 would be updated with the content update. As such, the updated version of the second privacy notice would be different than the previous version of the second privacy notice, whereas the updated version of the first privacy notice would be the same as the previous version of the first privacy notice in this particular example.

At 1320, the authoring application may compare the updated version of the privacy notice to the previous version of the privacy notice at the validation tool to identify a difference between the updated version and the previous version. As a non-limiting example, the validation tool may be configured to identify assets that have been added to or removed from the specification document with the content update as well as corresponding values that have been changed with the content update.

At 1322, the validation module may present the difference between the updated version and the previous version to the administrative user via the administrative interface. For example, the validation module may present assets that have been added or removed from the specification document with the content update and may present values that have been changed at the specification document with the content update. As a non-limiting example, the validation module may present the difference as: "A 'ASSET_10' has been added to the privacy statement as 'VALUE_10'." As another example, the validation module may present the difference as: "The 'ASSET_10' has been removed from the terms of use, which previously included 'VALUE_10'." As yet another example, the validation module may present the difference as: "The 'ASSET_10' of the terms of use has been change from 'ASSET_10' to 'ASSET_11'."

At 1324, the validation tool may prompt the administrative user to submit a validation response to the validation tool upon presentation of the difference between the updated version and the previous version to the administrative user. As one example, the validation response may specify an approval or a denial of the updated version. At 1326, the authoring application may receive the validation response from the administrative user at the validation tool.

At 1328, the validation module may judge whether the validation response received at the validation tool specifies an approval of the privacy notice. If the answer at 1328 is judged yes, the process flow may proceed to 1330. At 1330, the updated version of the privacy notice may be deployed in a web page retrievable by the client user when the validation response specifies the approval of the updated version of the privacy notice. For example, with regards to first privacy notice 151, the updated version of the first privacy notice may be deployed in web page 134 upon approval by the administrative user. It should be appreciated that the process flow of FIG. 13 may be similarly applied to legal notices. For example, with regards to first legal notice 155, the updated version of the first legal notice may be deployed in web page 134 upon approval by the administrative user. In some embodiments, the validation tool may be configured to store the updated version of the privacy notice or the legal notice at the data store as approved documents 196. Thus, in at least some embodiments, the validation authoring application may deploy the updated version of the privacy notice in a web page retrievable by the client user only when the validation response specifies the approval of the updated version of the privacy notice.

In some embodiments, deploying the updated version of the privacy notice in the web page may further include deploying the difference between the updated version and the previous version identified at 1320 in the web page retrievable by the client user. For example, the web page may be configured to cause the web browser to present the updated version of the privacy notice (or legal notice) and the difference between the updated version and the previous version to the client user via the graphical user interface of the web browser. In this way, the client user may be notified of a change in the privacy policy of the web page or web site associated with the web page when presented with the updated version of the privacy notice. It should be appreciated that a similar approach may be applied to notify the client user of differences between an updated version of a legal notice and a previous version of the legal notice.

Alternatively, if the answer at 1328 is judged no, the process flow may proceed to 1332. At 1332, the previous version of the privacy notice may be deployed in a web page retrievable by the client user when the validation response specifies the denial of the updated version of the privacy notice. Where the previous version of the privacy notice has been already deployed in the web page, for example, as described at 1312, then the process flow may end. In this way, the client user may be permitted to retrieve a web page including the updated privacy notice or updated legal notice only after approval is received at the validation tool from the administrative user.

It should be appreciated that the process flows of FIGS. 2 and 9-12 may represent instructions executable by the processing subsystem of the client system. It should also be appreciated that the example data structures depicted by FIGS. 5-8 and 14-16 are merely non-limiting examples. As such, other suitable data structures may be used. Furthermore, any suitable number of different privacy notices and legal notices may be deployed in a given web page. For example, a web page may include four or more different privacy notices and four or more different legal notices that may be rendered by the web browser responsive to the notification setting at the web browser. Further still, any suitable number of different privacy notices and legal notices may be generated from a given specification document via the localization tool, where these different privacy notices and legal notices may be deployed in one or more web pages that may be retrieved by client users via their respective web pages.

It will be appreciated that the computing devices described herein (e.g., client system 110 and administrative system 160) may be any suitable computing device configured to execute the programs described herein. For example, the computing devices may be a mainframe computer, personal computer, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. It will be appreciated that computer-readable media may be provided having program instructions stored thereon, which upon execution by a computing device, cause the computing device to execute the methods described above and cause operation of the systems described above. It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An administrative system for deploying privacy notices in web pages, the administrative system comprising:
   computer readable storage media comprising instructions executable by a processing subsystem to:
   prompt an administrative user to submit specified content to a specification tool;
   generate a specification document at the specification tool using the specified content;
   generate a collection of privacy notices at a localization tool using the specification document in accordance with a localization schema, the collection of privacy notices including a first privacy notice and a second privacy notice;
   present the collection of privacy notices to the administrative user for approval via an administrative interface;
   prompt the administrative user to submit a validation response upon presentation of the collection of privacy notices to the administrative user;
   receive the validation response at the validation tool, the validation response specifying an approval or a denial of the collection of privacy notices;
   deploy the collection of privacy notices in a web page retrievable by a client user via a web browser only after the validation response specifying the approval has been received at the validation tool and;
   where the web page including the collection of privacy notices causes the web browser to present one of the first privacy notice or the second privacy notice to the client user via a graphical user interface of the web browser responsive to a notification setting specified at the web browser by the client user.

2. The administrative system of claim 1, where the first privacy notice comprises:
   the second privacy notice and additional content supplementing the second privacy notice.

3. The administrative system of claim 1, where the computer readable storage media further comprises instructions executable by the processing subsystem to:
   generate a collection of legal notices at the localization tool using the specification document in accordance with the localization schema, the collection of legal notices including a first legal notice comprising a service agreement specifying terms of use and a second legal notice;
   present the collection of legal notices generated via the localization tool to the administrative user for approval via the administrative interface, the validation response further specifying an approval or a denial of the collection of legal notices; and
   deploy the collection of legal notices in the web page retrievable by the client user via a web browser only after the validation response specifying the approval has been received at the validation tool.

4. The administrative system of claim 1, where the computer readable storage media further comprises instructions executable by the processing subsystem to:
   prompt the administrative user to submit the specified content by presenting a wizard application to the administrative user via the administrative interface; and
   receive the specified content from the client user via the wizard application.

5. The administrative system of claim 1, where the first privacy notice includes different content than the second privacy notice.

6. The administrative system of claim 1, where the localization schema maps assets and values of the specified content to the collection of privacy notices and where the computer readable storage media further comprises instructions executable by the processing subsystem to:
   receive a localization directive from the administrative user at the localization tool; and
   vary the localization schema according to the localization directive.

7. The administrative system of claim 6, where the localization directive specifies a total number of privacy notices included in the collection of privacy notices generated at the localization tool.

8. The administrative system of claim 6, where the localization directive specifies a type of privacy notice included in the collection of privacy notices generated by the localization tool.

9. The administrative system of claim 8, where the first privacy notice includes one of a layered privacy statement, a P3P privacy statement, and a long form privacy statement; and where the second privacy notice includes another of the layered privacy statement, the P3P privacy statement, and the long form privacy statement.

10. The administrative system of claim 1, where the second privacy notice includes a hyperlink specifying the first privacy notice as a destination anchor.

11. An administrative system for generating privacy notices and legal notices deployable to a client user via a web page, the administrative system comprising:
   computer readable storage media comprising instructions executable by a processing subsystem to:

prompt the administrative user via an administrative interface to submit specified content to a specification tool;

generate a specification document at the specification tool using the specified content submitted by the administrative user;

receive the specification document at a localization tool;

generate a collection of privacy notices and a legal notice using the specification document at the localization tool in accordance with a localization schema, the collection of privacy notices including at least a first privacy notice and a second privacy notice, the first privacy notice including content that supplements the second privacy notice, and the legal notice comprising a service agreement specifying terms of use including a privacy notice component; and deploy the first privacy notice and the second privacy notice together in a first web page retrievable by the client user via the web browser, the first web page causing the web browser to present one or more of the first privacy notice and the second privacy notice to the client user via a graphical user interface responsive to a notification setting specified at the web browser by the client user.

12. The administrative system of claim 11, further comprising, deploying the legal notice in the first web page or in a second web page retrievable by the client user via the web browser.

13. The administrative system of claim 11, where the collection of privacy notices further includes a third privacy notice; where the first privacy notice includes a long form privacy statement, the second privacy notice includes a layered privacy statement, and the third privacy notice includes a P3P privacy statement.

14. The administrative system of claim 13, where the third privacy notice includes a P3P compact privacy statement.

* * * * *